(12) United States Patent
Cho

(10) Patent No.: US 10,659,538 B2
(45) Date of Patent: May 19, 2020

(54) WIRELESS DEVICE AND COMMUNICATION CONNECTION METHOD WITH EXTERNAL DEVICE

(71) Applicant: Samsung Electronics Co., Ltd, Gyeonggi-do (KR)

(72) Inventor: Yeongku Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 15/349,988

(22) Filed: Nov. 11, 2016

(65) Prior Publication Data
US 2017/0134503 A1   May 11, 2017

(30) Foreign Application Priority Data
Nov. 11, 2015  (KR) .......................... 10-2015-0158372

(51) Int. Cl.
*H04L 29/08* (2006.01)
*G07C 5/08* (2006.01)
(Continued)

(52) U.S. Cl.
CPC ............ *H04L 67/141* (2013.01); *G07C 5/008* (2013.01); *G07C 5/0825* (2013.01); *H04L 67/12* (2013.01);
(Continued)

(58) Field of Classification Search
CPC .. H04W 8/005; H04L 63/101; H04L 63/0876; H04L 67/16; H04L 67/12; H04L 67/141; Y02D 70/144
See application file for complete search history.

(56) References Cited

U.S. PATENT DOCUMENTS 7,555,265 B2   6/2009  Uchiyama
9,088,961 B1 *  7/2015  Davis ................... H04W 76/00
(Continued)

FOREIGN PATENT DOCUMENTS

KR      20100062699 A      6/2010
KR      20130128797 A     11/2013
(Continued)

OTHER PUBLICATIONS

"Trusted Third Party—Applied Cryptography." YouTube, Udacity, Apr. 26, 2012, www.youtube.com/watch?v=xhPG0aoGZTI.*
(Continued)

*Primary Examiner* — Austin J Moreau

(57) ABSTRACT

A method for at a wireless device establishing a communication connection with an external device is disclosed. The wireless device stores unique information of at least one external device connectable with the wireless device in a connection target list, and receives a connection waiting command from a server connected with the wireless device. In response to the received connection waiting command, the wireless device changes a status thereof to a connection waiting status allowing a connection with the external device, and receives a connection request from the external device finding the wireless device which is in the connection waiting status. If unique information of the connection-requesting external device is contained in the connection target list, the wireless device performs a communication connection with the connection-requesting external device, receives a command data regarding a transportation device from the connected external device, and transmits the received command data to the transportation device.

14 Claims, 11 Drawing Sheets

(51) Int. Cl.
  *H04W 4/80* (2018.01)
  *G07C 5/00* (2006.01)
  *H04W 4/48* (2018.01)
  *H04W 4/44* (2018.01)
  *H04W 4/40* (2018.01)

(52) U.S. Cl.
  CPC .......... *H04L 67/16* (2013.01); *H04L 67/2809* (2013.01); *H04W 4/80* (2018.02); *G07C 2205/02* (2013.01); *H04W 4/40* (2018.02); *H04W 4/44* (2018.02); *H04W 4/48* (2018.02); *Y02D 70/00* (2018.01)

(56) References Cited

U.S. PATENT DOCUMENTS

| | | |
|---|---|---|
| 2007/0296559 A1 | 12/2007 | Fehr |
| 2008/0082221 A1* | 4/2008 | Nagy .................... G07C 5/008 701/2 |
| 2011/0119743 A1* | 5/2011 | Gleim ................ H04L 63/0807 726/6 |
| 2012/0088462 A1* | 4/2012 | Mader ................ H04W 4/029 455/161.1 |
| 2012/0214413 A1* | 8/2012 | Rose ........................ H04L 63/18 455/41.1 |
| 2013/0139218 A1* | 5/2013 | Roulland .............. G06F 21/42 726/3 |
| 2013/0331147 A1 | 12/2013 | Chang et al. |
| 2014/0188348 A1* | 7/2014 | Gautama ............... B60W 10/30 701/48 |
| 2014/0227979 A1* | 8/2014 | Maihoefer ............. H04L 63/18 455/41.2 |
| 2014/0357269 A1 | 12/2014 | Zhou et al. |
| 2014/0378055 A1 | 12/2014 | Pal et al. |
| 2015/0024688 A1 | 1/2015 | Hrabak et al. |
| 2016/0198310 A1* | 7/2016 | Chalmers .............. H04W 4/046 455/456.1 |

FOREIGN PATENT DOCUMENTS

| | | |
|---|---|---|
| WO | 2012010210 A1 | 1/2012 |
| WO | 2013187666 A1 | 12/2013 |

OTHER PUBLICATIONS

Foreign Communication From a Related Counterpart Application, PCT Application No. PCT/KR2016/012781, International Search Report dated Jan. 20, 2017, 3 pages.

Communication from a foreign patent office in a counterpart foreign application, European Patent Office, "Supplementary European Search Report," Application No. EP 16864534.9, dated Jul. 6, 2018, 8 pages.

\* cited by examiner

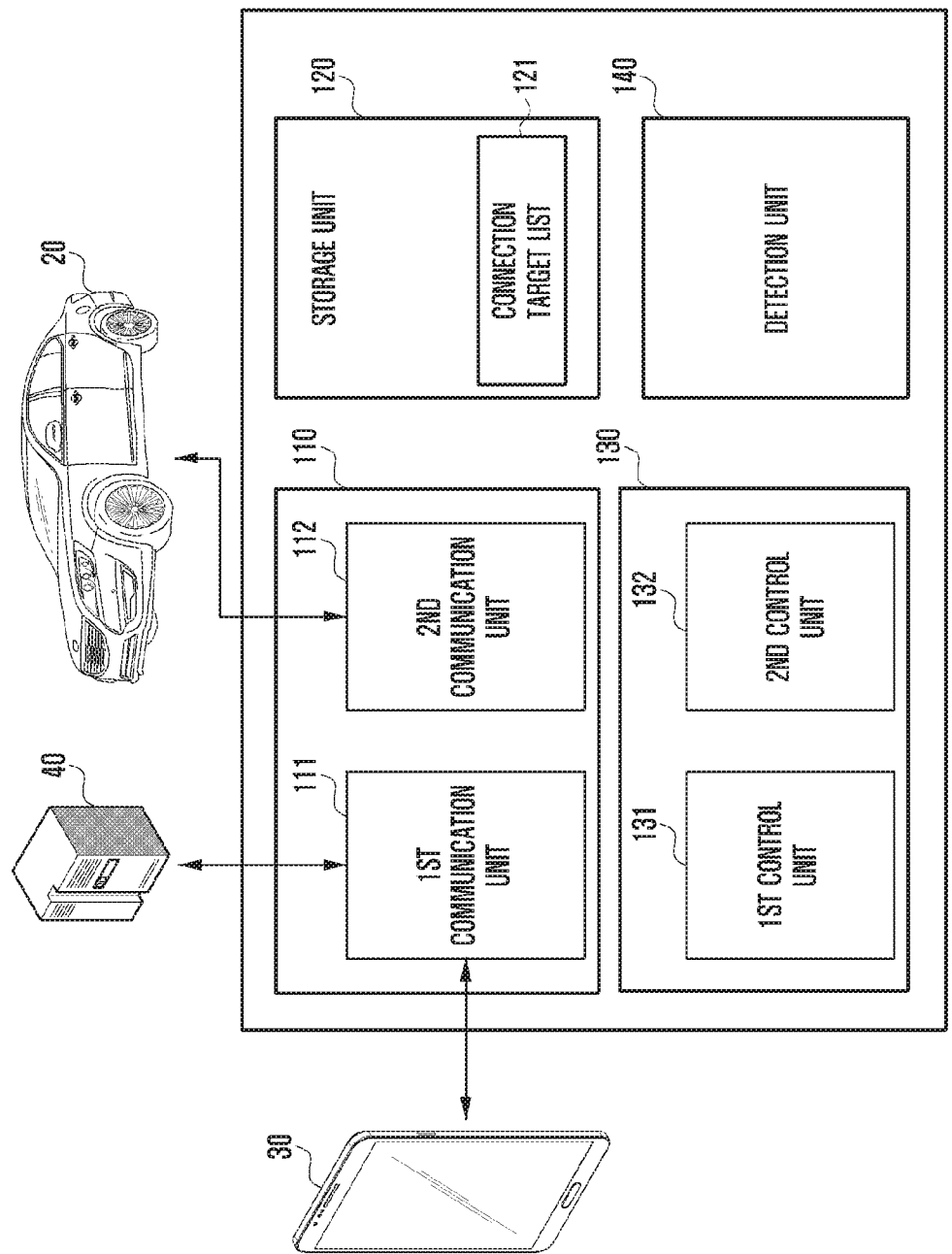

WIRELESS DEVICE AND COMMUNICATION CONNECTION METHOD WITH EXTERNAL DEVICE

CROSS-REFERENCE TO RELATED APPLICATION AND CLAIM OF PRIORITY

The present application is related to and claims the benefit under 35 U.S.C. § 119(a) of a Korean patent application filed on Nov. 11, 2015 in the Korean intellectual property office and assigned serial number 10-2015-0158372, the entire disclosure of which is hereby incorporated by reference.

TECHNICAL FIELD

The present disclosure relates to a method for performing a communication connection with an external device at a wireless device capable of communicating with a server and a transportation device and to the wireless device implementing the method.

BACKGROUND

Normally, on-board diagnostics (OBD) is a system that lights a malfunction indication lamp (MIL) on a dashboard in case of any trouble of a vehicle such that a driver can rapidly identify and remedy malfunctions of the vehicle.

There are OBD-I and OBD-II as examples of such OBD. The OBD-I checks malfunctions due to disconnection or short-circuit of many kinds of input/output sensors connected to an engine control module (ECM), and the OBD-II further checks the rationality and performance of the sensors and any abnormal operation of a vehicle system.

Typically, the OBD is equipped in a dashboard of a vehicle. The OBD provides a self-diagnosis function of a vehicle and is thus useful to a repairman or a vehicle insurance company. Also, based on a feedback from the OBD, a driver can know his or her driving habit and improve safety in driving.

The OBD may obtain status information about a vehicle from the ECM of the vehicle. For example, the ECM may monitor vehicle information, such as fuel efficiency, revolutions per minute (RPM), a vehicle velocity, or the like, through several in-vehicle sensors and then provides such vehicle information to the OBD.

The OBD may have a wireless communication module and thus operate as a wireless device.

For example, the wireless device (e.g., OBD) may receive a control command of an external device (e.g., a driver's smart phone) and then deliver the received command to a transportation device (e.g., a vehicle). For this, a communication connection between the wireless device and the external device is required.

Each of the above-mentioned devices may provide a user interface (UI) through which a user can carry out a communication connection. For example, if the respective devices comply with Bluetooth (BT) communication protocol, a device that receives a request for a communication connection may change a mode to a discoverable mode in response to a user input through the UI. Meanwhile, a device that sends the communication connection request may scan neighboring external devices and then provide a scan list that contains identification information of specific external devices which are in a discoverable mode. Additionally, in response to a user input for selecting one device in the scan list, this device may perform pairing with the selected device. In this case, for the communication connection between devices complying with the BT communication protocol, a process of providing the UI to a user may be required.

If the device that receives the communication connection request fails to provide any UI associated with a communication connection, the request-sending device may receive a user input for unique information (e.g., a PIN code, etc.) of the request-receiving device. In this case, since such device unique information is often written on a packaging box of the device, this may cause a security vulnerability issue. Additionally, since the device that requests a communication connection does not know when the request-receiving device changes a mode to the discoverable mode, undesirable battery consumption may be caused for maintaining the on-state of the discoverable mode.

Therefore, a wireless device (e.g., OBD) that tries a communication connection with an external device may be required to provide a suitable UI for receiving a user input for the communication connection. However, if such a wireless device is equipped in a transportation device, this wireless device may be located under a dashboard beyond a user's reach. In addition, this wireless device consuming a battery of the transportation device may invite a battery discharge of the transportation device. Also, since a third-party's control for the transportation device directly influences a user's safety, it is required to enhance the security between a wireless device and an external device.

SUMMARY

To address the above-discussed deficiencies, it is a primary object to provide a method for a communication connection with an external device at a wireless device capable of communicating with a transportation device includes operations of storing unique information of at least one external device connectable with the wireless device in a connection target list, receiving a connection waiting command from a server connected with the wireless device, in response to the received connection waiting command, changing a status thereof to a connection waiting status allowing a connection with the external device, receiving a connection request from the external device having findound the wireless device which is in the connection waiting status; if unique information of the connection-requesting external device is contained in the connection target list, performing a communication connection with the connection-requesting external device in response to the connection request, receiving a command data regarding the transportation device from the connected external device, and transmitting the received command data to the transportation device.

In this method, the operation of storing the unique information of the at least one external device connectable with the wireless device in the connection target list includes receiving unique information of the connectable external device from the server, and storing the received unique information of the external device in the connection target list.

Additionally, the operation of transmitting the received command data to the transportation device includes, if the command data regarding the transportation device is an encoded command data, decoding the encoded command data by using a decoding key received from the server; and transmitting the decoded command data to the transportation device.

The encoded command data includes a command data encoded using an encoding key received from the server by the external device connected with the wireless device.

This method further includes operation of terminating the connection waiting status when the communication connection with the connection-requesting external device is performed.

The connection waiting status includes a discoverable mode status.

The operation of receiving the connection request from the external device includes receiving a pairing request from the external device.

The wireless device communicates with the external device in a wireless communication manner and communicates with the transportation device in a wired communication manner.

According to another embodiment, a communication method at a server supporting a communication connection of a wireless device capable of communicating with a transportation device includes operations of transmitting, to the wireless device, unique information of an external device connectable with the wireless device and a connection waiting command for changing a status of the wireless device to a connection waiting status, and when the wireless device performs a communication connection with the external device, based on the unique information of the external device and the connection waiting command, receiving a notification of a successful connection between the wireless device and the external device from the wireless device or the external device.

According to still another embodiment, a method for a communication connection with a wireless device capable of communicating with a transportation device, at an external device, includes operations of transmitting unique information of the external device to a server, displaying a scan list containing identification information of the wireless device entered in a connection waiting status based on the transmitted unique information of the external device, when the identification information of the wireless device is selected in the scan list, performing a communication connection with the wireless device having the selected identification information; and transmitting a command data regarding the transportation device to the connected wireless device.

According to yet another embodiment, a wireless device includes a storage unit configured to store unique information of at least one external device connectable with the wireless device in a connection target list, a communication unit configured to communicate with a server and a transportation unit, and a control unit configured to, in response to a connection waiting command received from the server, change a status to a connection waiting status allowing a connection with the external device; receive a connection request, through the communication unit, from the external device finding the wireless device which is in the connection waiting status; if unique information of the connection-requesting external device is contained in the connection target list, perform a communication connection with the connection-requesting external device through the communication unit in response to the connection request; receive a command data regarding the transportation device from the connected external device; and transmit the received command data to the transportation device.

When the communication unit receives unique information of the connectable external device from the server, the control unit may be further configured to controls the storage unit to store the received unique information of the external device in the connection target list.

If the command data regarding the transportation device is an encoded command data, the control unit is further configured to decode the encoded command data by using a decoding key received from the server, and to transmit the decoded command data to the transportation device through the communication unit.

The encoded command data includes a command data encoded using an encoding key received from the server by the external device connected with the wireless device.

The control unit is further configured to terminate the connection waiting status when the communication connection with the connection-requesting external device is performed.

The connection waiting status includes a discoverable mode status.

The connection request includes a pairing request.

The communication unit communicates with the external device in a wireless communication manner and communicates with the transportation device in a wired communication manner.

According to still another embodiment, a server may include a communication unit configured to communicate with an external device and a wireless device capable of communicating with a transportation device, and a control unit configured to: transmit, to the wireless device through the communication unit, unique information of an external device connectable with the wireless device and a connection waiting command for changing a status of the wireless device to a connection waiting status, and when the wireless device performs a communication connection with the external device, based on the unique information of the external device and the connection waiting command, receive a notification of a successful connection between the wireless device and the external device from the wireless device or the external device through the communication unit.

According to still another embodiment, an external device may include a display unit; a communication unit communicating with a server; and a control unit configured to transmit unique information of the external device to the server through the communication unit, display, through the display unit, a scan list containing identification information of the wireless device entered in a connection waiting status based on the transmitted unique information of the external device, when the identification information of the wireless device is selected in the scan list, perform a communication connection with the wireless device having the selected identification information through the communication unit, and transmit a command data regarding the transportation device to the connected wireless device through the communication unit.

According to yet another embodiment, a computer-readable storage medium records thereon one or more programs for executing operations of storing unique information of at least one external device connectable with the wireless device in a connection target list, receiving a connection waiting command from a server connected with the wireless device, in response to the received connection waiting command, changing a status thereof to a connection waiting status allowing a connection with the external device, receiving a connection request from the external device finding the wireless device which is in the connection waiting status, if unique information of the connection-requesting external device is contained in the connection target list, performing a communication connection with the connection-requesting external device in response to the connection request; receiving a command data regarding the transportation device from the connected external device; and transmitting the received command data to the transportation device.

According to yet another embodiment, a computer-readable storage medium may record thereon one or more programs for executing operations of transmitting, to the wireless device, unique information of an external device connectable with the wireless device and a connection waiting command for changing a status of the wireless device to a connection waiting status, and when the wireless device performs a communication connection with the external device based on the unique information of the external device and the connection waiting command, receiving a notification of a successful connection between the wireless device and the external device from the wireless device or the external device.

According to yet another embodiment, a computer-readable storage medium may record thereon one or more programs for executing operations of transmitting unique information of the external device to a server, displaying a scan list containing identification information of the wireless device entered in a connection waiting status based on the transmitted unique information of the external device, when the identification information of the wireless device is selected in the scan list, performing a communication connection with the wireless device having the selected identification information, and transmitting a command data regarding the transportation device to the connected wireless device.

According to various embodiments of this disclosure, power consumption of the wireless device may be minimized when the wireless device and the external device are connected. For example, once the connection is established between the external device and the wireless device, the wireless device is not required thereafter to pass a connection waiting status for a communication connection. This may reduce power consumption of the transportation device.

Additionally, since the wireless device receives unique information of the external device and then, based on this information, performs a communication connection with only the external device registered in a connection target list, a communication security of the wireless device can be enhanced.

Also, even in case a third-party's external device tries a communication connection through any counterfeit unique information which is identical with that of a user's external device, this trial can be effectively blocked through a procedure of authenticating external devices at a server.

And also, a user is not required to directly manipulate the wireless device for a communication connection, and thus user's convenience may be improved. Besides, even though a user changes his or her external device, a rapid and convenient connection of a new external device is possible by registering the new external device through a server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B is a block diagram illustrating the configuration of a wireless device according to another embodiment of the present disclosure.

DETAILED DESCRIPTION

Figure 1:
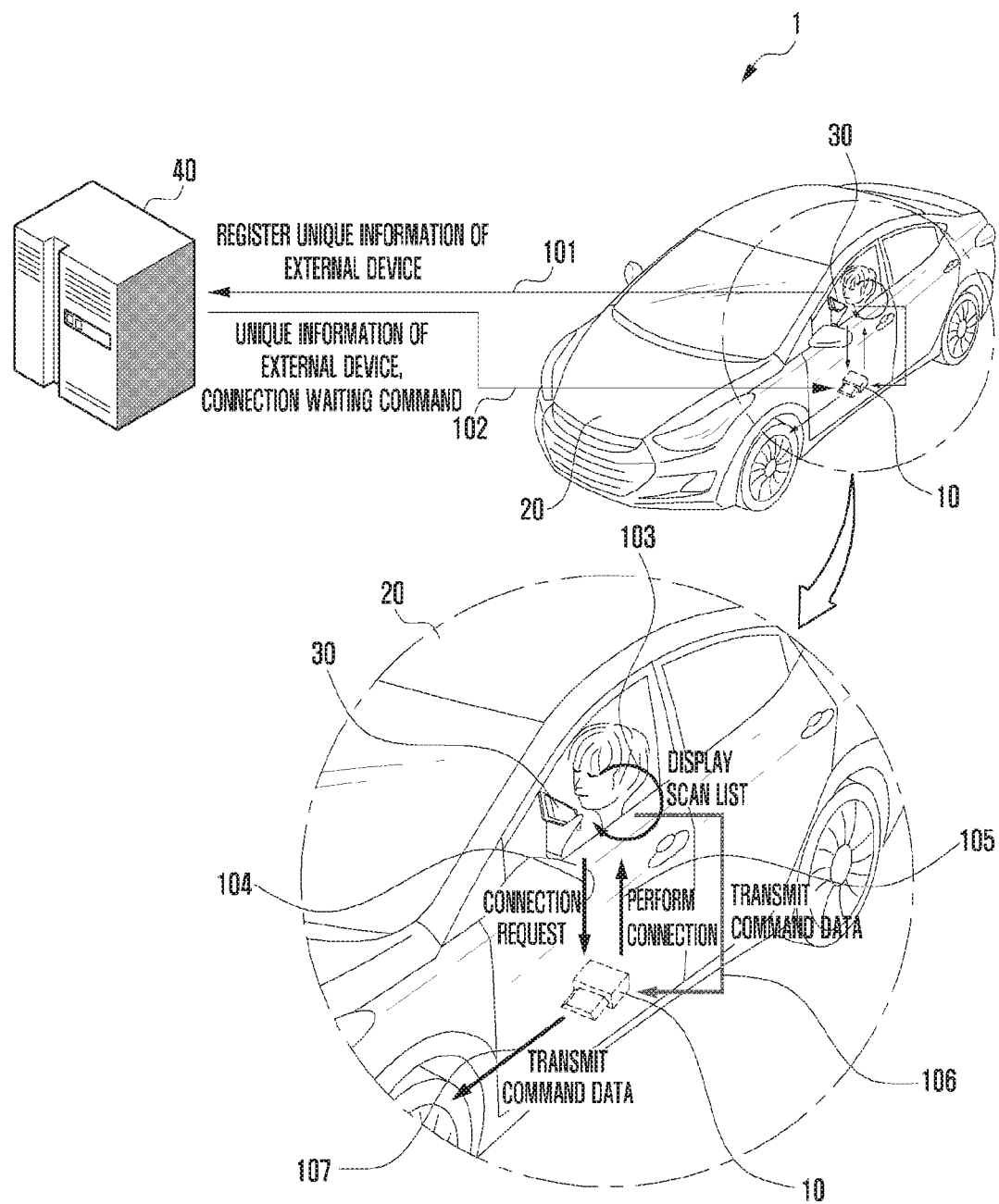
FIG. 1 is a diagram illustrating a system for a communication connection between a wireless device and an external device according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical or scientific terminologies, have the same meaning as that understood by a person skilled in the art to which the present disclosure belongs.

FIG. 1 is a diagram illustrating a system for a communication connection between a wireless device and an external device according to an embodiment of the present disclosure.

Referring to FIG. 1, a system 1 can include a wireless device 10, a transportation device 20, an external device 30, and a server 40.

In this embodiment shown in FIG. 1, the wireless device 10 can collect status information about the transportation device 20 or control a function of the transportation device 20 while performing a communication with the transportation device 20. The wireless device 10 can include at least one of an on-board diagnostics (OBD), a smart phone, a tablet personal computer (tablet PC), a mobile phone, a video phone, an e-book reader, a desktop PC, a laptop PC, a netbook computer, a personal digital assistant (PDA), a portable multimedia player (PMP), an MP3 player, a mobile medical device, a camera, an internet of things (IoT) device, and a wearable device.

Although in this disclosure the wireless device 10 is described as including the OBD, this is exemplary only and not to be construed as a limitation.

The OBD can collect status information about the transportation device 20. This status information can be, for example, information about a driving status of the transportation device 20 (e.g., vehicle), such as a velocity, a driving time, revolutions per minute (RPM), a driving distance, average fuel efficiency, or instantaneous fuel efficiency, information about an engine status such as a coolant temperature, an intake air temperature, an intake air quantity, an engine oil temperature, a transmission oil temperature, an injection fuel quantity, an oxygen sensor voltage, an ignition angle, a carbon emission quantity, or an air fuel ratio, and any other information such as a break status, a battery voltage, or an air conditioner refrigerant pressure.

If any trouble occurs in the transportation device 20, information about this trouble can be identified through information collected through the OBD. The configuration of the wireless device 10 will be described in detail in FIGS. 2A and 2B.

The transportation device 20 can be a movable device carrying a person or cargo. The transportation device 20 can be moved under the control of a person or control device (e.g., an artificial intelligence electronic device, an automatic navigation device, etc.). The transportation device 20 can be, for example, a vehicle, an airplane, a motorbike, a vessel, a train, or the like.

In this embodiment shown in FIG. 1, a vehicle is exemplarily described as the transportation device 20. The vehicle 20 can have an in-vehicle electronic control system (not shown) for electronically controlling various functions associated with driving. This in-vehicle electronic control system can have the wireless device 10 so as to electronically support various control operations for the vehicle 20, for example, such as an exhaust emission control, an engine control, a light control, a brush control, or the like. The in-vehicle electronic control system can include a vehicle connector (e.g., an OBD terminal, an OBD connector, etc.), which can be designed in one of various forms suitable for connection with various connectors of the wireless device 10.

In the FIG. 1 embodiment, the external device 30 can transmit or receive data to or from the wireless device 10 equipped in the transportation device 20.

At operation 101 in FIG. 1, unique information of the external device 30 can be registered in the server 40.

For example, a user can access the server 40 through a device connection application (e.g., a device-to-device application) installed in the wireless device 10 and then register unique information of the external device 30 in the server 40. In response to a registration request for unique information, the external device 30 can transmit the unique information thereof to the server 40. This unique information can include, for example, a MAC address (e.g., Bluetooth MAC address).

At operation 102, the server which receives the unique information of the external device 30 can transmit the received information to the wireless device 10. Then the wireless device 10 can register the received unique information of the external device 30 in a connection target list. This connection target list can be also referred to as, e.g., a white list.

Additionally, in response to the registration request for unique information, the external device 30 can perform a scanning function for finding neighboring devices located around the external device 30. This scanning function can be, for example, a scan function (e.g., a Bluetooth scan function). The server 40 which receives the unique information of the external device 30 can transmit, to the wireless device 10, a connection waiting command for entering the wireless device 10 in a connection waiting status. The wireless device 10 which receives the connection waiting command can change a status thereof to the connection waiting status in which the wireless device 10 can be connected to neighboring devices. The connection waiting status can be, e.g., a discoverable mode status. Specifically, the wireless device 10 can change an operating mode of a communication module (e.g., a Bluetooth framework) of the wireless device 10 to a discoverable mode.

In another embodiment, the unique information of the external device 30 can be already registered in the connection target list of the wireless device 10. In this case, through the device connection application installed in the wireless device 10, a user can perform a scanning function for finding neighboring devices located around the external device 30. Then the external device 30 can transmit, to the server 40, a connection waiting command that requests a change of the status of the wireless device 10 into the connection waiting status.

The server 40 which receives the connection waiting command can transmit the received command to the wireless device 10 at operation 102. The wireless device 10 which receives the connection waiting command can be entered in the connection waiting status.

At operation 103, the external device 30 can display, as a search result for neighboring devices, a scan list that contains identification information of found neighboring devices. This identification information can be, for example, a MAC address, a service set identifier (SSID), a product name, a serial number, and/or an icon.

The found neighboring device can be a neighboring device which is in a connection waiting status. Therefore, the identification information of the wireless device 10 can be contained in the scan list. A user can select the identification information of the wireless device 10 in the scan list such that a communication connection can be performed between the external device 30 and the wireless device 10.

In response to user's selection, the external device 30 can send a connection request to the selected wireless device 10 at operation 104. This connection request can include, for example, a pairing request that the external device 30 requests a connection with the wireless device 10.

In response to the connection request, the wireless device 10 can determine whether the external device 30 that requests a communication connection is a device registered in the connection target list. Namely, the wireless device 10 can determine whether identification information of the external device 30 requesting the communication connection is contained in the connection target list. Specifically, in response to the pairing request, the communication module (e.g., the Bluetooth framework) of the external device 30 can determine whether the identification information of the external device 30 is contained in the white list.

If it is determined that the external device 30 that requests the communication connection is registered in the connection target list, the wireless device 10 can perform a connection with the external device 30 at operation 105. For example, the wireless device 10 can transmit, to the external device 30, a signal of accepting a pairing with the external device 30 and perform the connection with the external device 30. Then the wireless device 10 can transmit, to the server 40, a notification of a successful connection with the external device 30.

Additionally, when the connection with the external device 30 is performed, the wireless device 10 can terminate the connection waiting status.

On the contrary, if it is determined that the external device that requests the connection is a third-party device, the wireless device 10 can block the connection with the external device.

If the connection between the wireless device 10 and the external device 30 is established, the external device 30 can transmit a command data regarding the transportation device 20 to the wireless device 10 at operation 106.

Such a command data regarding the transportation device can be classified into, for example, a generic command data and an enhanced command data. The generic command data can be, for example, a command data complying with the OBD standards. The enhanced command data can be, for example, a command data complying with formats prescribed according to manufacturers of the wireless device 10 or types of the transportation device 20.

In another example, such a command data can be classified into a control command data and an acquisitive command data. The control command data can include, as a command data for controlling the transportation device 20, a write command data, an actuation command data, and the like. The acquisitive command data can include a read command data as a command data for acquiring status information about the transportation device 20.

Specifically, the control command data can include a command data for locking or unlocking a door of the transportation device 20, a command data for locking or unlocking a window of the transportation device 20, a command data for turning on or off a hazard lamp of the transportation device 20, a command data for turning on or off a right or left lamp of the transportation device 20, a command data for sounding a car horn of the transportation device 20, a command data for opening or closing a trunk of the transportation device 20, a command data for driving a break of the transportation device 20, a command data for driving an accelerator pedal of the transportation device 20, and the like.

The acquisitive command data can include a command data for acquiring a key coding count of the transportation device 20, a command data for acquiring the amount of engine oil of the transportation device 20, a command data for acquiring a fastened state of a seat belt of the transportation device 20, a command data for acquiring a battery life or battery residual quantity of the transportation device 20, a command data for acquiring a light state of a lamp of the transportation device 20, a command data for acquiring a gear state of the transportation device 20, a command data for acquiring a steering wheel angle of the transportation device 20, a command data for acquiring a break state of the transportation device 20, a command data for acquiring a velocity of the transportation device 20, a command data for acquiring an engine RPM of the transportation device 20, and the like.

At operation 107, the wireless device 10 that receives the command data regarding the transportation device 20 can transmit the received command data to the transportation device 20.

The transportation device 20 that receives the command data can be controlled according to the received command data.

Figure 2A:
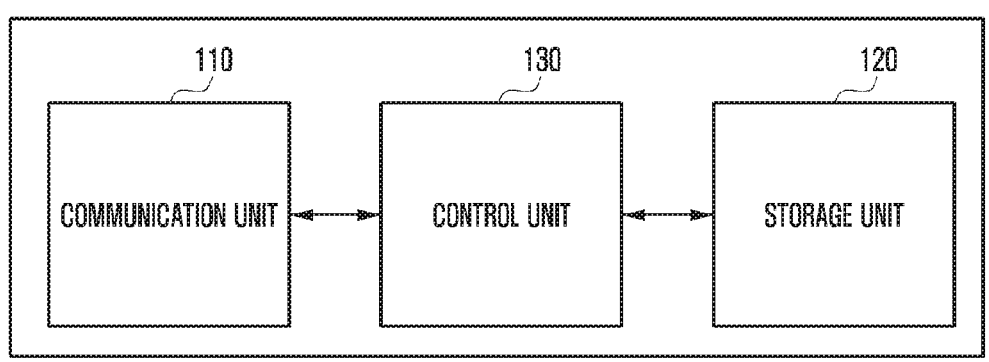
FIG. 2A is a block diagram illustrating the configuration of a wireless device according to an embodiment of the present disclosure.

FIG. 2A is a block diagram illustrating the configuration of the wireless device 10 according to an embodiment of the present disclosure.

Referring to FIG. 2A, the wireless device 10 can include a communication unit 110, a storage unit (or a memory) 120, and a control unit (or a processor) 130.

The communication unit 120 can perform communication with at least one of the external device 30 and the transportation device 20 in a wired or wireless communication manner.

For example, the communication unit 110 can communicate with the external device 30 in a wireless communication manner. Additionally, the communication unit 110 can communicate with the transportation device 20 in a wired communication manner.

In case of performing a wireless communication, the communication unit 110 can perform communication based on, for example, Wi-Fi, Bluetooth, Zigbee, Picocast, or NFC (Near Field Communication) technique. In this case, the communication unit 110 can transmit and receive various kinds of connection information such as SSID and a session key, then establish a communication connection (e.g., establish a communication channel) by using the connection information, and then transmit and receive various kinds of information. Also, the communication unit 110 can perform communication based on various communication standards such as IEEE, 3G (3rd generation), 3GPP (3rd Generation Partnership Project), LTE (Long Term Evolution), GPS (Global Positioning System), or the like.

In case of performing a wired communication, the communication unit 110 can use, for example, a 20-pin connector, a 16-pin connector, or a USB connector. The communication unit 110 can perform communication based on communication standards such as On-Board Diagnosis Version I (OBD-1), OBD-2, European On-Board Diagnosis (EOBD), Korean On-Board Diagnosis (KOBD), K-Line, RS-232, CAN (Controller Area Network), or the like.

In one embodiment, the communication unit 110 can receive unique information of at least one external device connectable with the wireless device 10 from the server 40 and then deliver the received information to the control unit 130.

In another embodiment, the communication unit 110 can receive a connection waiting command from the server 40 and then deliver the received command to the control unit 130.

In still another embodiment, the communication unit 10 can receive a connection request from the external device 30 that finds the wireless device 10, based on a connection waiting status of the wireless device 10, and then deliver the received request to the control unit 130.

In yet another embodiment, if unique information of the external device 30 that requests a connection is registered in a target list, the communication unit 110 can transmit a connection acceptance signal to the external device 30.

In further another embodiment, the communication unit 110 can receive a command data regarding the transportation device 20 from the external device 30 and then deliver the received data to the transportation device 20.

The storage unit 120 stores various programs and data executed and processed in the wireless device 10 and can be formed of at least one of a nonvolatile memory and a volatile memory. For example, the nonvolatile memory can correspond to a ROM (Read Only Memory), a flash memory, or the like and the volatile memory can correspond to a RAM (Random Access Memory) or the like. Also, the storage unit 120 can include a memory card (not shown) (e.g., a micro SD card, a memory stick) equipped in the wireless device 10.

In one embodiment, the storage unit 120 can store a connection target list that contains identification information of external devices which are connectable with the wireless device 10.

The control unit 130 controls on the whole the operation of the wireless device 10.

In one embodiment, in response to the connection waiting command received from the server 40, the control unit 130 can change the status of the wireless device 10 to the connection waiting status in which the wireless device 10 can be connected to the external device 30. Also, in response to the connection request received from the external device 30 that finds the wireless device 10, based on the connection waiting status of the wireless connection 10, the control unit 130 can determine whether unique information of the connection-requesting external device 30 is registered in the connection target list stored in the storage unit 120. In case the unique information of the connection-requesting external device 30 is registered in the connection target list, the control unit 130 can perform the connection with the external device 30 through the communication unit 110.

In another embodiment, when the wireless device 10 is connected with the external device 30, the control unit 130 can transmit a command data regarding the transportation device 20, received from the external device 30, to the transportation device 20 through the communication unit 110.

In still another embodiment, if unique information of the external device 30 connectable with the wireless device 10 is received from the server 40, the control unit 130 can insert the received unique information of the external device 30 in the connection target list of the storage unit 120.

In yet another embodiment, if the command data regarding the transportation device 20 is an encoded command data, the control unit 130 can decode the encoded command data by using a decoding key received from the server 40 and then transmit the decoded command data to the transportation device 20 through the communication unit 110. In this case, the encoded command data can be a command data which is encoded by the external device 30 using an encoding key received from the server 40.

In further another embodiment, when the connection is established with the connection-requesting external device 30, the control unit 130 can terminate the connection waiting status of the wireless device 10.

FIG. 2B is a block diagram illustrating the configuration of the wireless device 10 according to another embodiment of the present disclosure.

Referring to FIG. 2B, the wireless device 10 can include the communication unit 110, the storage unit 120, the control unit 130, and a detection unit 140. In addition, the wireless device 10 can further include an audio processing unit (not shown) having a microphone and a speaker, a touch pad (not shown) for a touch-based input, an input unit (not shown) for a mechanical key input, a display unit (not shown) for visually outputting a screen data associated with the operation of the wireless device 10, a light emitting unit (not shown) including an LED or the like, a battery (not shown) for supplying electric power to the above elements, and the like.

The communication unit 110 can perform communication with at least one of the external device 30, the server 40, and the transportation device 20 in a wired or wireless communication manner.

The communication unit 110 can include a first communication unit 111 and a second communication 112. The first and second communication units 111 and 112 can be distinguished from each other according to functionality or configuration thereof. For example, in this disclosure, the communication unit 110 can be divided into the first communication unit 111 for communicating with the external device 30 or the server 40 and the second communication unit 112 for communicating with the transportation device 20. Alternatively, the communication unit 110 can be divided into the first communication unit 111 based on a wireless communication and the second communication unit 112 based on a wired communication.

The first communication unit 111 can communicate with at least one of the external device 30 and the server 40. The first communication can include, e.g., a telecommunication module (not shown) and a short range communication module (not shown).

For example, the wireless device 10 can communicate with the server 40 by using the telecommunication module. For example, the telecommunication module can perform communication based on communication standards such as IEEE, 3G, 3GPP, LTE, GPS, or the like.

Additionally, the wireless 10 can communicate with the external device 30 by using the short range communication module. For example, the short range communication module can perform communication based on communication standards such as Wi-Fi, Bluetooth, NFC, Zigbee, Picocast, or the like.

The second communication unit 112 can communicate with the transportation device 20 in a wired communication manner. For example, the second communication unit 112 can include at least one of a K-Line communication module, an RS-232 communication module, and a CAN communication module. Using one of these modules, the second communication unit 112 can communicate with the transportation device 20 in a wired communication manner.

The detection unit 140 can be formed of various types of sensors for sensing the status of the wireless device 10 and the status of the transportation device 20. For example, the detection unit 140 can include at least one of an acceleration sensor, a gyro sensor, an illuminance sensor, a proximity sensor, a pressure sensor, a noise sensor (e.g., a microphone), a video sensor (e.g., a camera module), a temperature sensor, a shock sensor, and a timer.

The detection unit 140 can detect, as status information of the transportation device 20, at least one of a battery residual quantity of the transportation device 20, a temperature of the transportation device 20, a velocity of the transportation device 20, an impact of the transportation device 20, and an acceleration of the transportation device 20. Also, the detection unit 140 can detect, as status information of the wireless device 10, at least one of a temperature of the wireless device 10, a battery residual quantity of the wireless device 10, and an operating state of the wireless device 10.

The storage unit 120 stores various kinds of software and data executed and processed in the wireless device 10 and can be formed of at least one of a nonvolatile memory and a volatile memory. Several examples of the storage unit 120 are previously discussed with reference to FIG. 2A.

In one embodiment, the storage unit 120 can store a connection target list 121 that contains identification information of an external device connectable with the wireless device 10. The connection target list 121 can include at least identification information of one external device which can transmit the command data to the transportation device 20. The connection target list 121 can be referred to as, e.g., a white list.

In another embodiment, the storage unit 120 can store a list of data transmission denial devices (not shown). This list can contain identification information of at least one external device 30 which is incapable of transmitting the command data to the transportation device 20.

In this case, the identification information of the external device 30 used by a user of the transportation device 20 can be contained in the connection target list 121. On the contrary, the identification information of the external device 30 used by a third party can be contained in the data transmission denial device list.

The control unit 130 can control on the whole the operation of the wireless device 10. The control unit 130 can include a first control unit 131 and a second control unit 132. The first control unit 131 and the second control unit 132 can be distinguished from each other according to functionality or configuration thereof.

The first control unit 131 can be an application processor (AP) (e.g., MSM8916 AP, etc.) for driving an application program or an operation system (e.g., Android OS, Tizen OS, etc.). The first control unit 131 can include an OBD control module (not shown) for communicating with the second control unit 132. The OBD control module can be also referred to as, e.g., an OBD agent module.

The second control unit 132 can be a micro controller unit (MCU) (e.g., the MCU of OBD-1 or OBD-2, etc.) for performing self-diagnosis of the transportation device 20. The second control unit 132 can change the format of a command data received from the first control unit 131 into another format (e.g., CAN communication format, KWP 2000 communication format, etc.) transmittable to the transportation device 20 and then deliver it to the transportation device 20.

The first and second control units 131 and 132 can transmit or receive data to or from each other through a security module (not shown). The security module can be, for example, an embedded secure element (eSE). For example, through the security module, the first control unit 131 can encode an acquisitive command data and then transmit it to the second control unit 132. Also, the second control unit 132 that acquires status information of the transportation device 20 as a response to the acquisitive command data can encode the status information and then transmit it to the first control unit 131 through the security module.

The first control unit 131 can include a server client module (not shown) that processes data received from or to be transmitted to the server 40 through the first communication unit 111.

In one embodiment, the server client module 40 can receive unique information of the external device 30, registered by a user, from the server 40 and then register the received unique information of the external device 30 in the connection target list.

In another embodiment, the server client module can receive the connection waiting command from the server 40 and then, based on the received connection waiting command, change the operating mode of a communication module (e.g., a Bluetooth framework) of the first communication unit 111 into a discoverable mode.

In still another embodiment, when the wireless device 10 is connected with the external device 30, the server client module can transmit, to the server 40, a notification of a successful connection with the external device 30.

Figure 3:
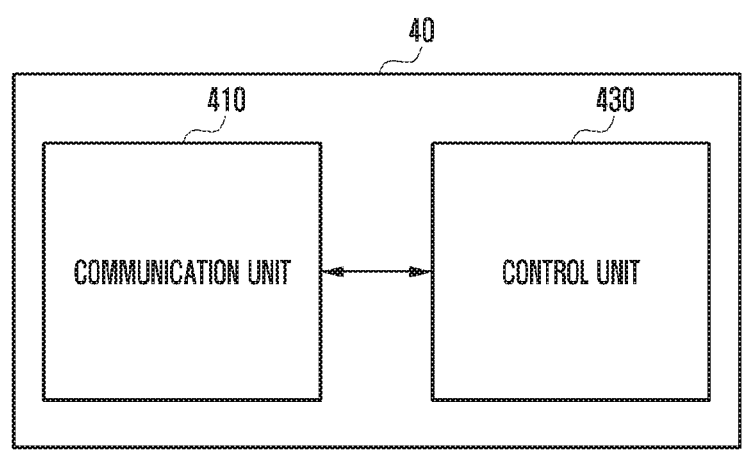
FIG. 3 is a block diagram illustrating the configuration of a server according to an embodiment of the present disclosure.

FIG. 3 is a block diagram illustrating the configuration of the server 40 according to an embodiment of the present disclosure.

In the FIG. 3 embodiment, the server 40 can be a server for providing a service using the wireless device 10. For example, the server 40 can be a server that supports an IoT (Internet of Things) environment by using the wireless device 10. Particularly, the server 40 can be a server that not only supports an IoT environment but also provides a security solution (e.g., MDM (Mobile Device Management)) to the wireless device 40 or the external device 30. The server 40 can include a cloud server. Normally, the cloud server can be utilized as a storage medium in which data is registered using a software environment, like a cloud floating in the internet environment, regardless of fixed hardware.

The server 40 can include a communication unit 410 and a control unit 430. Meanwhile, FIG. 3 illustrates only some elements related to this disclosure so as to avoid obscuring the subject matter of the present disclosure. As will be understood by those skilled in the art, any typical element other than elements shown in FIG. 3 can be further included essentially or optionally.

The communication unit 410 can communicate with the wireless device 10 and the external device 30 in a wireless communication manner. The communication unit 410 can perform communication based on various communication standards such as IEEE, 3G, 3GPP, LTE, or the like.

The control unit 430 can control on the whole the operation of the server 40.

In one embodiment, if unique information of the external device 30 is received from the external device 30, the control unit 430 can transmit the unique information of the external device 30, being connectable with the wireless device 10, to the wireless device 10 through the communication unit 410.

In another embodiment, if the connection waiting command for entering the transportation device 20 in the connection waiting status is received from the external device 30, the control unit 430 can transmit the connection waiting command to the wireless device 10 through the communication unit 410.

If the wireless device 10 is connected with the external device 30, based on transmission of the unique information of the external device 30 and the connection waiting command, the control unit 430 can receive a connection success notification from the wireless device 10 or the external device 30 through the communication unit 410.

Figure 4:
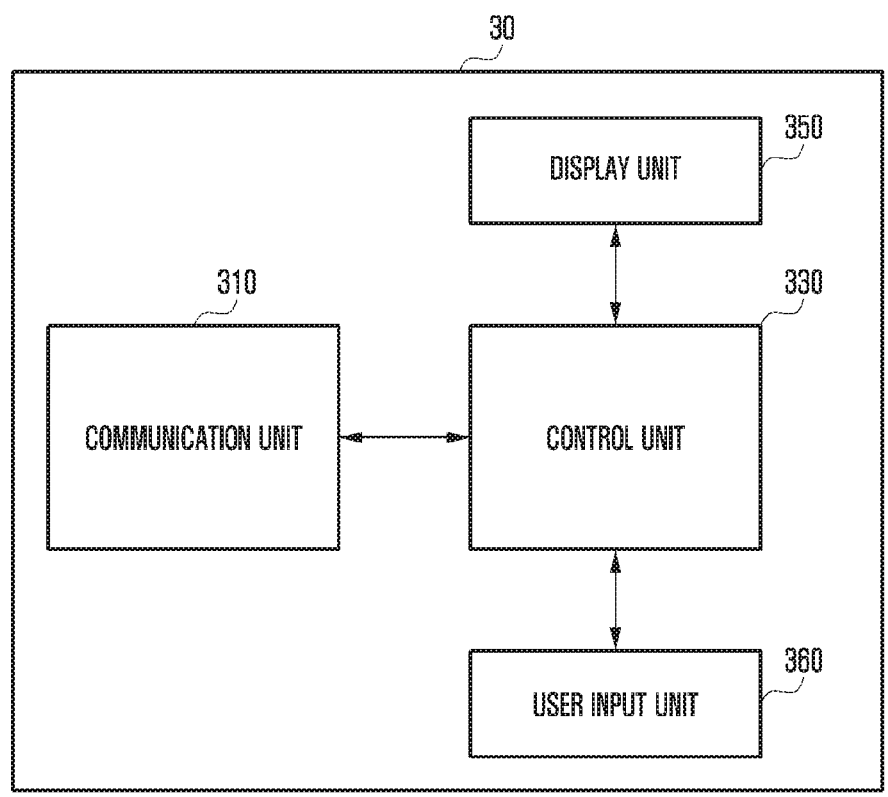
FIG. 4 is a block diagram illustrating the configuration of an external device according to an embodiment of the present disclosure.

FIG. 4 is a block diagram illustrating the configuration of the external device 30 according to an embodiment of the present disclosure.

The external device 30 can include, for example, at least one of a portable terminal, a smart phone, a tablet PC, a mobile phone, a video phone, an e-book reader, a desktop PC, a laptop PC, a netbook computer, a PDA, a PMP, an MP3 player, a mobile medical device, a camera, and a wearable device.

The external device 30 can include a communication unit 310, a control unit 330, a display unit 350, and a user input unit 360. Meanwhile, Meanwhile, FIG. 4 illustrates only some elements related to this disclosure so as to avoid obscuring the subject matter of the present disclosure. As will be understood by those skilled in the art, any typical element other than elements shown in FIG. 4 can be further included essentially or optionally.

The communication unit 310 can communicate with the wireless device 10 and the sever 40 in a wired or wireless communication manner.

In one embodiment, the communication unit 310 can communicate with the server 40 in a telecommunication manner. For example, the communication unit 310 can perform communication with the server 40, based on various communication standards such as IEEE, 3G, 3GPP, LTE, or the like.

In another embodiment, the communication unit 310 can communicate with the wireless device 10 in a short range communication manner or in a wired communication manner. For example, the communication unit 310 can perform communication with the wireless device 10, based on communication standards such as Wi-Fi, Bluetooth, NFC, Zigbee, Picocast, or the like. Alternatively, the communication unit 310 can perform communication with the wireless device 10, based on communication standards such as USB, RS-232, or the like.

In one embodiment, the communication unit 310 can transmit unique information of the external device 30 to the server 40.

In another example, if identification information of the wireless device 10 is selected in the scan list of the external device 30, the communication unit 310 can transmit the connection request signal to the wireless device 10.

In still another example, if the external device 30 is connected with the wireless device 10, the communication unit 310 can transmit a command data regarding the transportation device 20 to the wireless device 10.

The display unit 350 can display various screens on a display region. Such a screen can be, for example, an application execution screen. In this disclosure, the application execution screen can include an execution screen of a device connection application (e.g., an OBD device-to-device application). Meanwhile, various kinds of contents (e.g., images, videos, or texts) and/or user interface (UI) elements for controlling such contents or the external device 30 can be displayed on the screen.

The display unit 350 can be formed of various types of a display panel. For example, the display panel can be implemented with various display techniques such as LCD (Liquid Crystal Display), OLED (Organic Light Emitting Diodes), AM-OLED (Active Matrix OLED), LCoS (Liquid Crystal on Silicon), DLP (Digital Light Processing), or the like.

The display unit 350 can be combined with at least one of front, side and rear parts of the external device 30 in the form of a flexible display. The flexible display can be bended or curved without damage through a thin and flexible substrate like paper. This flexible display can be typically manufactured using a glass substrate, a plastic substrate, or any other equivalent. The plastic substrate can be manufactured using a low temperature manufacturing process rather than a typical manufacturing process so as to prevent damage thereof. Also, by replacing the glass substrate enveloping flexible liquid crystals with a plastic film, a foldable and unfoldable flexibility can be given. This flexible display has advantages of a thin profile, a low weight, an impact resistance, bendability, and manufacturability of various forms.

The display unit 350 can be formed as a touch screen having a layered structure in combination with a touch panel (not shown) of the user input unit 360. The touch screen can have a function of detecting a location, area and pressure of a touch input as well as a display function. Also the touch screen can detect a proximity touch as well as a real touch.

The user input unit 360 can receive various commands from a user. The user input unit 360 can include at least one of a key, a touch panel, and a pen recognition panel.

The key (not shown) can include various types of keys such as a mechanical button or a jog wheel formed on front, side and/or rear parts of a body of the external device 30.

The touch panel (not shown) can detect a touch input by user's finger and then output a touch event value corresponding to the detected touch input.

The pen recognition panel (not shown) can detect a touch or proximity input of a touch pen (e.g., a stylus pen, a digitizer pen) and then output a corresponding touch or proximity event.

The control unit 330 can control on the whole the operation of the external device 30.

In one embodiment, the control unit 330 can control the display unit 350 to display the scan list having identification information of the wireless device 10 which is entered in the connection waiting status, based on unique information of the external device 30. In this case, when a selection signal of selecting identification information of the wireless device 10 from the scan list is received from the user input unit 360, the control unit 330 can perform a connection with the wireless device 10 through the communication unit 310. Also, when the wireless device 10 and the external device 30 are connected with each other, the control unit 330 can transmit a command data regarding the transportation device 20 to the connected wireless device 10 through the communication unit 310.

Figure 5:
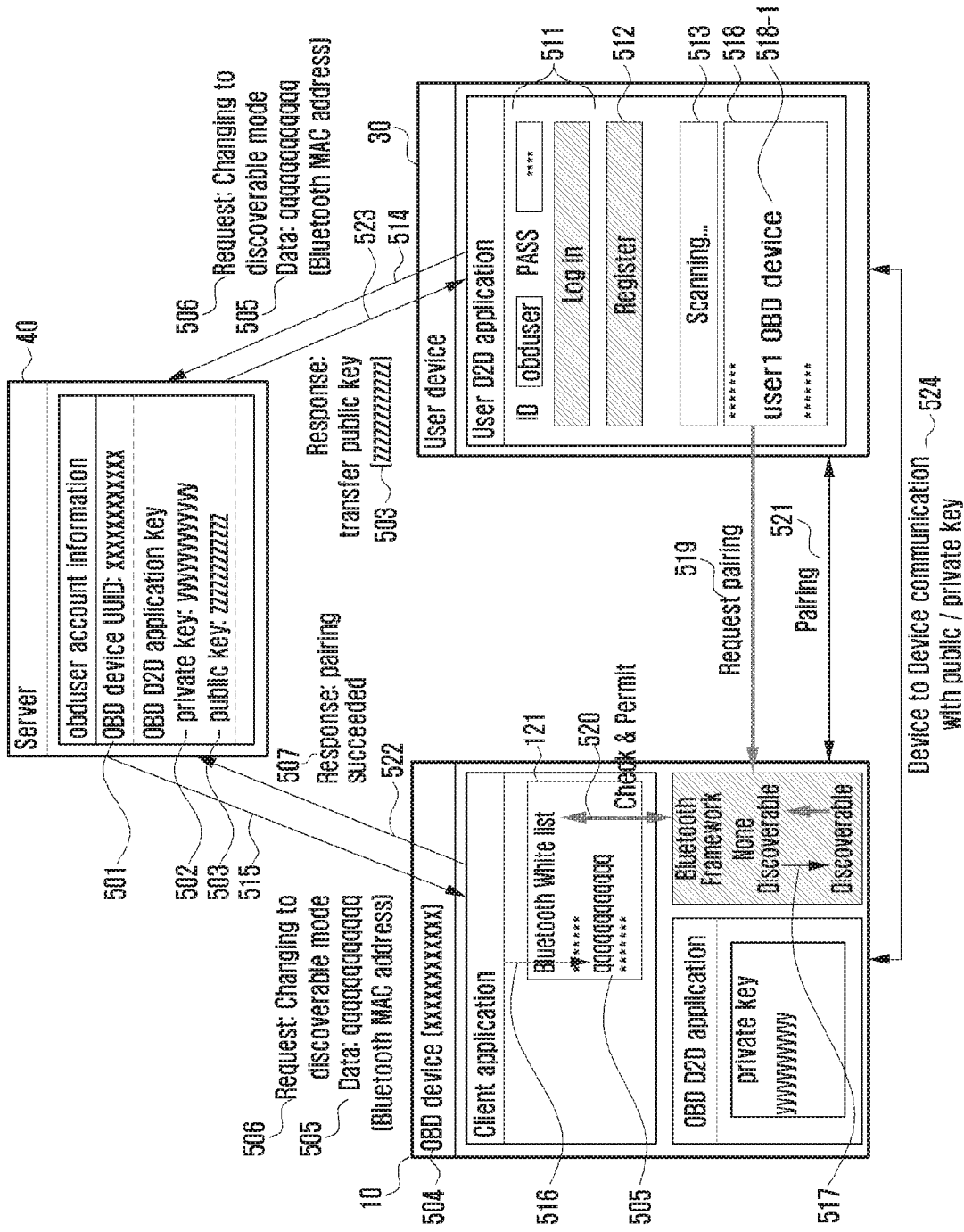
FIG. 5 is a diagram illustrating a communication connection process between a wireless device and an external device according to an embodiment of the present disclosure.

FIG. 5 is a diagram illustrating a communication connection process between the wireless device 10 and the external device 30 according to an embodiment of the present disclosure.

A user can access the server 40 to create a user account. Also, when purchasing the wireless device 10, the user can log in through the user account and then register the purchased wireless device 10 in the server 40. For example, the user can enter unique information 501 of the wireless device 10 and register the unique information 501 in the server 40. In FIG. 5, the unique information 501 of the wireless device 10 can be, for example, 'xxxxxxxxxxxx'.

When the wireless device 10 is registered in the server 40, the server 40 can create an encoding key 503 (e.g., a public key) and a decoding key 502 (e.g., a private key). For example, the server 40 can create the encoding key 503 and the decoding key 502 from a combination of the user account and an execution result of the device connection application (e.g., the OBD device-to-device application) at the server 40.

In this situation, if the wireless device 10 is booted, the server 40 can receive unique information 504 of the wireless device 10 from the wireless device 10 and, based on the received unique information, authenticate whether the wireless device 10 is registered in the server 40. For example, the server 40 can determine whether a value of the received unique information 504 is identical with that of the registered unique information 501.

If it is authenticated that the wireless device 10 is registered in the server 40, the server 40 can transmit, to the wireless device 10, the decoding key 502 created using the user account of the registered wireless device 10. In detail, the server 40 can transmit the created decoding key 502 to the device connection application of the wireless device 10.

In case the user accesses the server 40, creates the user account, and registers the wireless device 10, the user can perform login to the server 40 by entering an ID and a password through the external device 30 at operation 511.

Next, at operation 512, the user can register unique information of the external device 30 that needs to be connected with the wireless device 10.

Also, at operation 513, the external device 30 can perform a scanning function for finding neighboring devices located about the external device 30.

In one embodiment, when the user registers unique information of the external device 30, this unique information of the external device 30 can be mapped with the wireless device 10 which is previously registered by the user. Namely, the user can register, as unique information of one of devices connectable with the wireless device 10, the unique information of the external device 30.

In another embodiment, if there is no history about registering unique information of the external device 30 by the user, the external device 30 can activate and display a button for registering unique information.

When the user registers unique information 505 of the external device 30, the external device 30 can transmit the registered unique information 505 to the server 40 at operation 514. In FIG. 5, the unique information 505 of the external device 30 can be, for example, a Bluetooth MAC address represented as 'qqqqqqqqqqqq'.

Also, the external device 30 can transmit, to the server 40, a connection waiting command 506 for requesting a change to the connection waiting status of the wireless device 10.

The server 40 that receives the unique information 505 of the external device 30 and the connection waiting command 506 can transmit both the received unique information 505 and the received command 506 to the wireless device 10 at operation 515.

The wireless device 10 that receives the unique information 505 of the external device 30 can register, at operation 516, the received unique information 505 in the connection target list 121.

Also, the wireless device 10 that receives the connection waiting command 506 can change, at operation 517, the status thereof to the connection waiting status indicating that the wireless device 10 can communicate with neighboring external devices.

Meanwhile, the external device 30 that is performing the scanning function can display, at operation 518, a scan list that contains identification information of neighboring devices found as a result of scanning. In this case, since the wireless device 10 is in the connection waiting status, identification information 518-1 of the wireless device 10 can be contained in the scan list. In this case, in response to a user's input of selecting the identification information 518-1 of the wireless device 10, the external device 30 can send a request for connection to the selected wireless device 10 at operation 519.

In response to the connection request, the wireless device 10 can determine, at operation 520, whether the connection-requesting external device 30 is registered in the connection target list 121. If it is determined that the connection-requesting external device 30 is registered in the connection target list 121, the wireless device 10 can terminate the connection waiting status. Then, at operation 521, the wireless device 10 can perform the connection with the external device 30.

If the connection between the wireless device 10 and the external device 30 is performed, the wireless device 10 can transmit a notification 507 of a successful connection with the external device 30 to the server 40 at operation 522.

The server 40 that receives the connection success notification 507 can transmit the already created encoding key 503 to the external device 30 at operation 523.

The external device 30 that receives the encoding key 503 can perform, at operation 524, an authenticated communication with the wireless device 10 by using the received encoding key 503. For example, the external device 30 can encode the command data regarding the transportation device 20 by using the received encoding key 503 and then transmit it to the wireless device 10.

The wireless device 10 that receives the encoded command data can decode the encoded command data by using the decoding key 502. Then the wireless device 10 can transmit the decoded command data to the transportation device 20.

Figure 6:
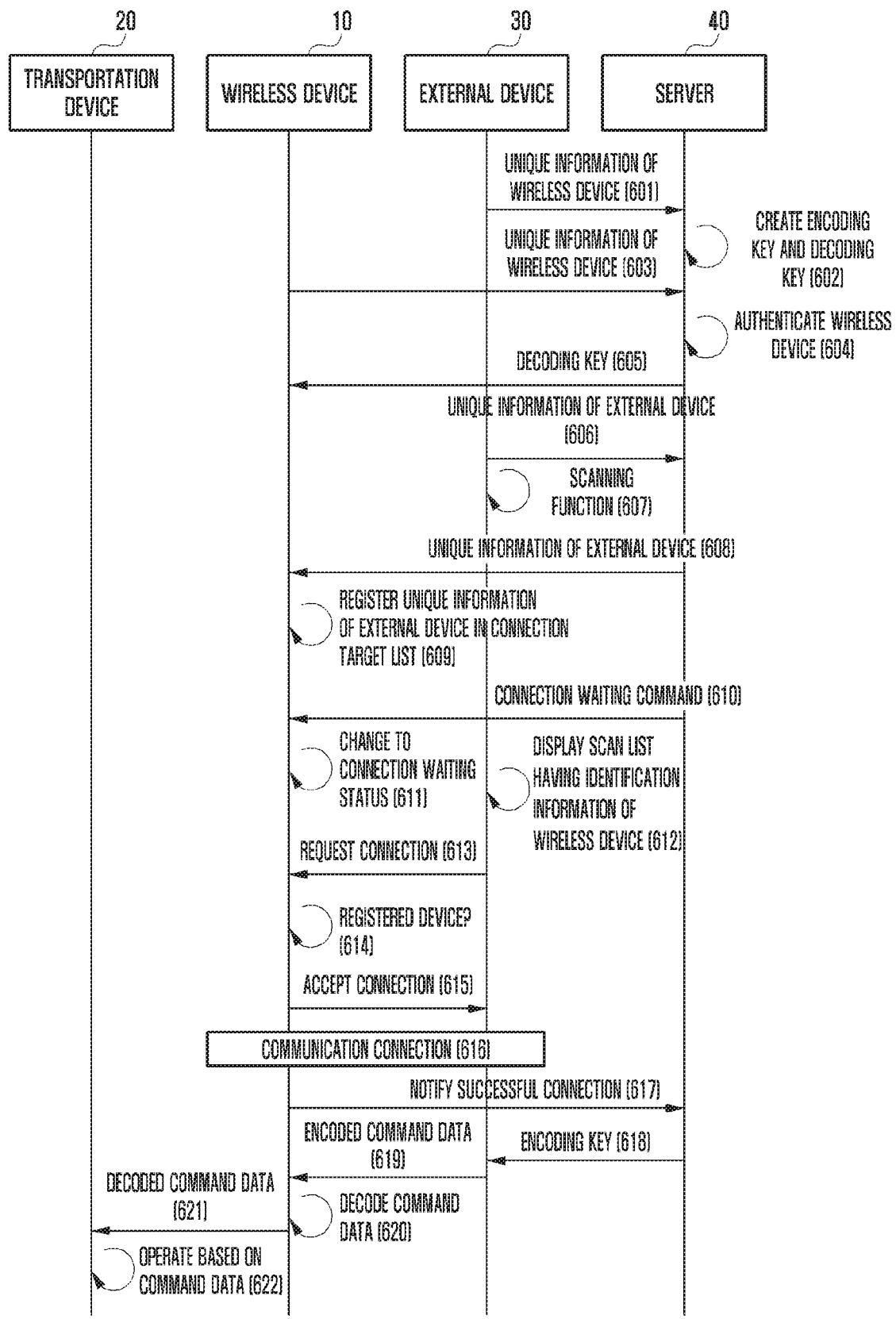
FIGS. 6 and 7 are flow diagrams illustrating a method for performing a communication connection between a wireless device and an external device according to an embodiment of the present disclosure.

FIG. 6 is a flow diagram illustrating a communication connection method between the wireless device 10 and the external device 30 according to an embodiment of the present disclosure.

Referring to FIG. 6, when a user registers unique information of the wireless device 10 through the external device 30, the external device 30 can transmit the unique information of the wireless device 10 to the server 40 at operation 601. Therefore, at operation 602, the server 40 can create an encoding key and a decoding key to be transmitted to the wireless device 10 and the external device 30.

When the wireless device 10 is booted, the wireless device 10 can transmit unique information thereof to the server 40 at operation 603. In this case, at operation 604, the server 40 can authenticate the wireless device 10 by using the received unique information of the wireless device 10. For example, the server 40 can authenticate the wireless device 10 depending on whether the unique information of the wireless device 10 received at operation 601 is identical with the unique information of the wireless device 10 received at operation 603.

If the wireless device 10 is authenticated, the server 40 can transmit, at operation 605, the decoding key, created at operation 602, to the wireless device 10.

Next, if the user registers unique information of the external device 30 in the server 40, the external device 30 can transmit the unique information thereof to the server 40 at operation 606. Also, at operation 607, the external device 30 can perform a scanning function for finding neighboring devices located around the external device 30.

At operation 608, the server 40 can transmit the unique information of the external device 30, received from the external device 30, to the wireless device 10. Therefore, at operation 609, the wireless device 10 can register the unique information of the external device 30, received from the server 40, in a connection target list.

Also, the server 40 that receives the unique information of the external device 30 can transmit a connection waiting command to the wireless device 10 at operation 610. Therefore, at operation 611, the wireless device 10 that receives the connection waiting command can be changed to a connection waiting status.

Since the wireless device 10 is changed to the connection waiting status, the external device 30 can display, at operation 612, a scan list that contains identification information of the wireless device 10.

In this case, in response to a user's input of selecting the identification information of the wireless device 10, the external device 30 can transmit, at operation 613, a connection request to the wireless device 10.

Therefore, at operation 614, the wireless device 10 can determine whether the connection-requesting external device 30 is registered in the connection target list.

If the connection-requesting external device 30 is registered in the connection target list, the wireless device 10 can transmit a connection acceptance to the external device 30 at operation 615.

Therefore, at operation 616, a communication connection can be performed between the wireless device 10 and the external device 30.

If the communication connection is completed between the wireless device 10 and the external device 30, the wireless device 10 can transmit a connection success notification to the server 40 at operation 617.

Therefore, at operation 618, the server 40 can transmit the encoding key to the external device 30.

At operation 619, the external device 30 that receives the encoding key can encode a command data regarding the transportation device 20 by using the received encoding key and then transmit the encoded data to the wireless device 10.

At operation 620, the wireless device 10 that receives the encoded command data can decode the encoded command data by using the decoding key received at operation 605.

At operation 621, the wireless device 10 can transmit the decoded command data to the transportation device 20.

Therefore, at operation 622, the transportation device 20 can operate based on the command data.

Figure 7:
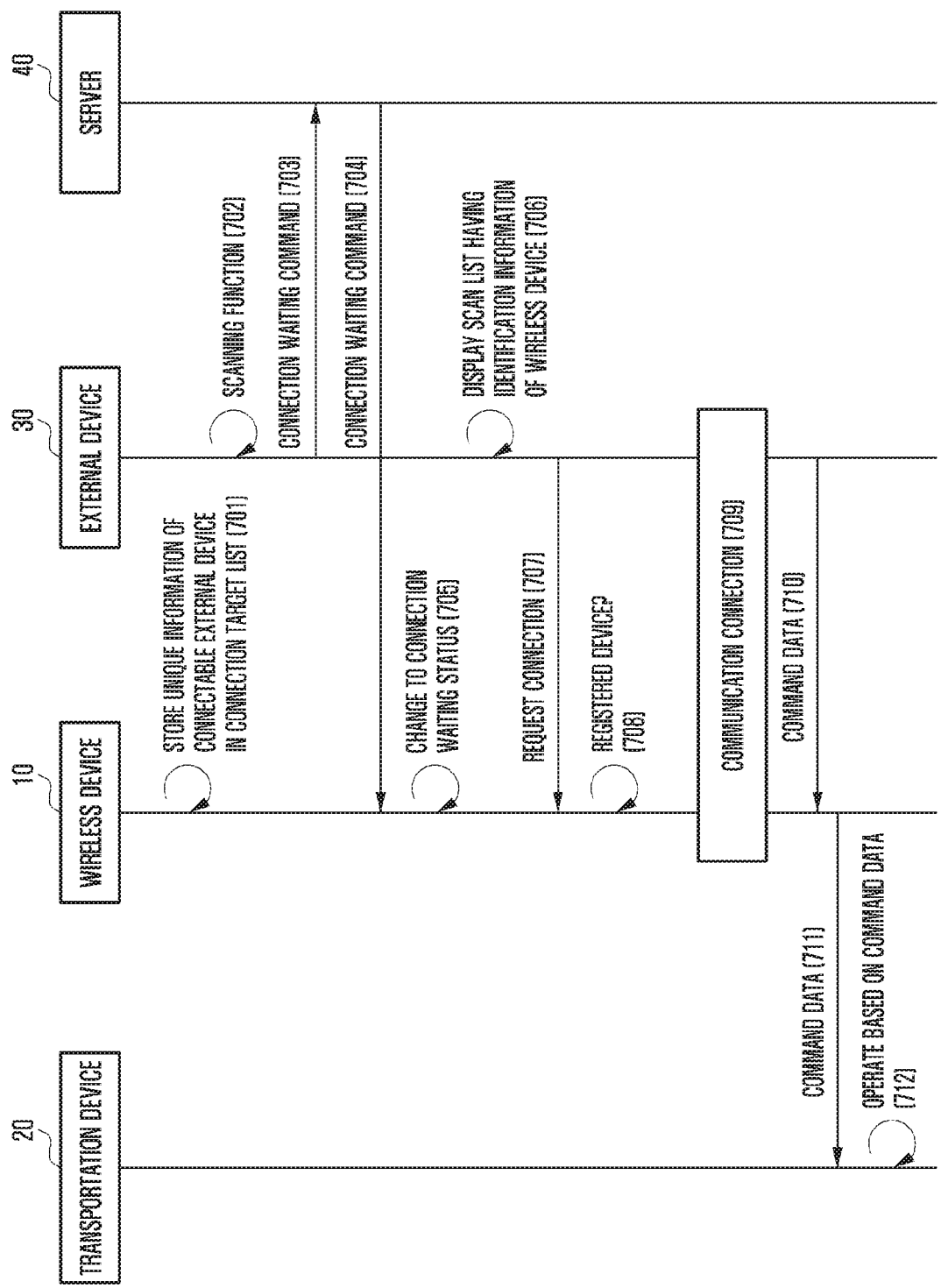

FIG. 7 is a flow diagram illustrating a communication connection method between the wireless device 10 and the external device 30 according to another embodiment of the present disclosure.

Referring to FIG. 7, at operation 701, the wireless device 10 can be in a state of storing, in a connection target list, unique information of at least one external device connectable with the wireless device 10.

If a user selects a scanning function for finding peripheral devices around the external device 30, the external device 30 can perform cute a scanning function at operation 720. Also, at operation 703, the external device 30 can transmit, to the serve 40, a connection waiting command for requesting the wireless device 10 to be entered in a connection waiting status.

At operation 704, the server 40 can transmit the received connection waiting command to the wireless device 10.

At operation 705, the wireless device 10 that receives the connection waiting command from the server 40 can be entered in the connection waiting status. Therefore, at operation 706, the external device 30 can display a scan list that contains identification information of the wireless device 10.

In this case, in response to a user input of selecting the identification information of the wireless device 10, the external device 30 can send a connection request to the wireless device 10 at operation 707.

Therefore, at operation 708, the wireless device 10 can determine whether the connection-requesting external device 30 is registered in the connection target list.

If the connection-requesting external device 30 is registered in the connection target list, a communication connection between the wireless device 10 and the external device 30 can be performed at operation 709.

After the communication connection, the wireless device 10 can transmit at operation 710 a command data regarding the transportation device 20 to the wireless device 10 in response to a user input of controlling the transportation device 20.

At operation 711, the wireless device 10 can transmit the received command data to the transportation device 20.

Therefore, at operation 712, the transportation device 20 can operate according to the command data.

Figure 8:
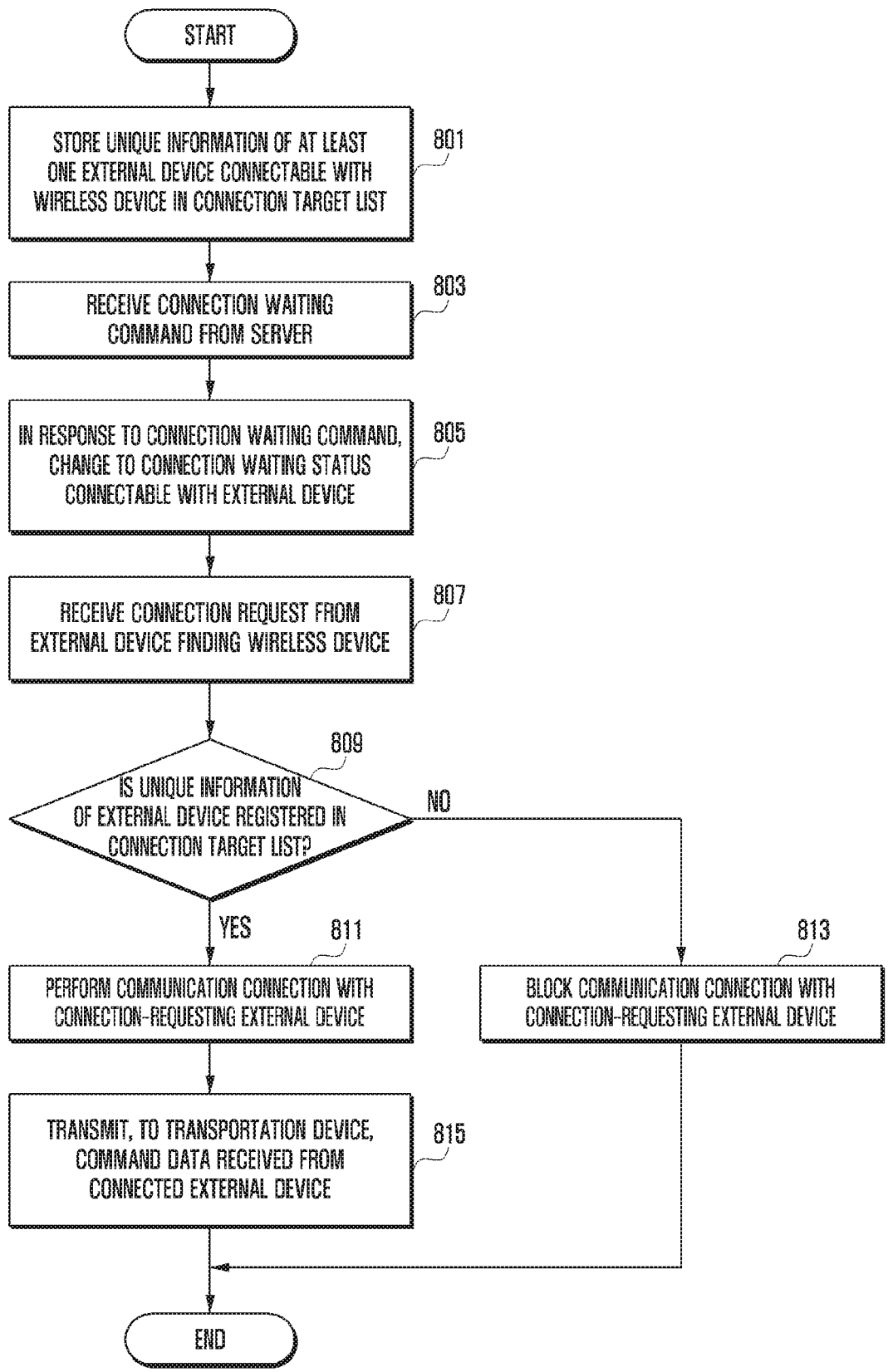
FIG. 8 is a flow diagram illustrating a method for performing a communication connection with an external device at a wireless device according to another embodiment of the present disclosure.

FIG. 8 is a flow diagram illustrating a method for performing a communication connection with the external device 30 at the wireless device 10 according to another embodiment of the present disclosure.

Referring to FIG. 8, at operation 801, the wireless device 10 can store, in a connection target list, unique information of at least one external device connectable with the wireless device 10.

In one embodiment, the wireless device 10 can receive the unique information of the external device 30, being connectable with the wireless device 10, from the server 40 and then store the received unique information in the connection target list.

In this status, at operation 803, the wireless device 10 can receive a connection waiting command from the server 40.

At operation 805, in response to the received connection waiting command, the wireless device 10 can be changed to (i.e., entered in) a connection waiting status indicating a status capable of being connected with the external device.

When the wireless device 10 is changed to the connection waiting status, the external device 30 can scan the wireless device 10, based on the connection waiting status of the wireless device 10. Then the external device 30 can send a request for connection to the wireless device 10.

At operation 807, the wireless device 10 can receive the connection request from the external device 30 that finds the wireless device 10. At this time, the connection request can be, for example, a pairing request.

When the connection request is received, the wireless device 10 can determine at operation 808 whether unique information of the connection-requesting external device 30 is registered in the connection target list.

If the unique information is registered in the connection target list, the wireless device 10 can perform a communication connection with the external device 30 at operation 811. In this case, the wireless device 10 connected with the external device 30 can terminate the connection waiting status. The connection waiting status can include, for example, a discoverable mode state.

If the unique information is not registered, the wireless device 10 can block a communication connection with the connection-requesting external device 30 at operation 813.

After the connection-requesting external device 30 is connected, the wireless device 10 can receive a command data regarding the transportation device 20 from the external device 30 at operation 815. And then, the wireless device 10 can transmit the received command data to the transportation device 20.

In one embodiment, the command data can be encoded using an encoding key received from the serve 40 by the external device 30. Therefore, the wireless device 10 can decode the encoded command data by using a decoding key received from the server 40. And then, the wireless device 10 can transmit the decoded command data to the transportation device 20.

Figure 9:
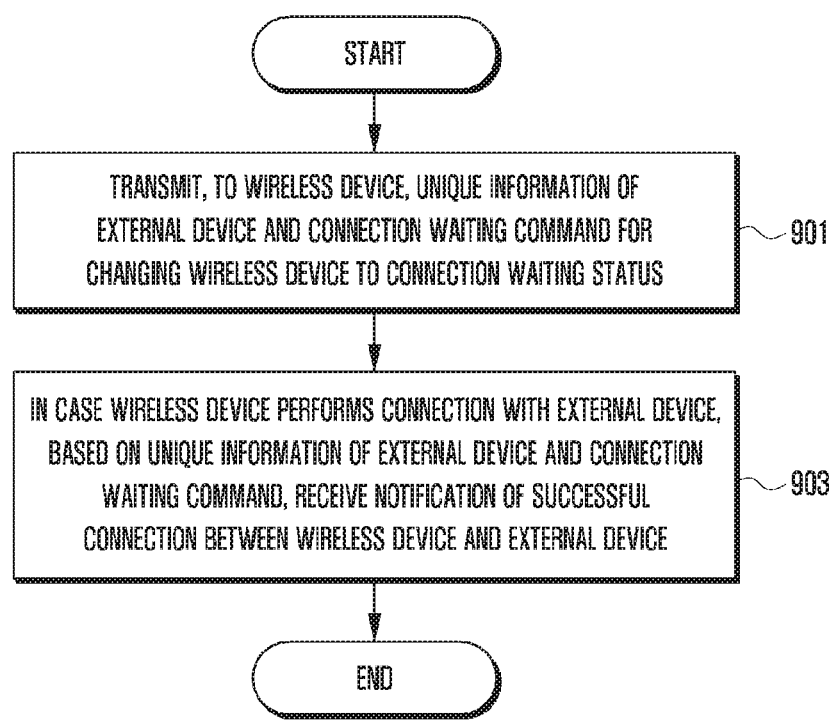
FIG. 9 is a flow diagram illustrating a method for supporting a communication connection of a wireless device at a server according to an embodiment of the present disclosure.

FIG. 9 is a flow diagram illustrating a method for supporting a communication connection of the wireless device 10 at the server 40 according to an embodiment of the present disclosure.

At operation 901, the server 40 can transmit, to the wireless device 10, both unique information of the external device 30 connectable with the wireless device 10 and a connection waiting command for entering the wireless device 10 in a connection waiting status.

At operation 903, the wireless device 10 can perform a connection with the external device 30, based on the unique information of the external device 30 and on the connection waiting command. In this case, the server 40 can receive, from the wireless device 10 or the external device 30, a notification of a successful connection between the wireless device 10 and the external device 30.

Figure 10:
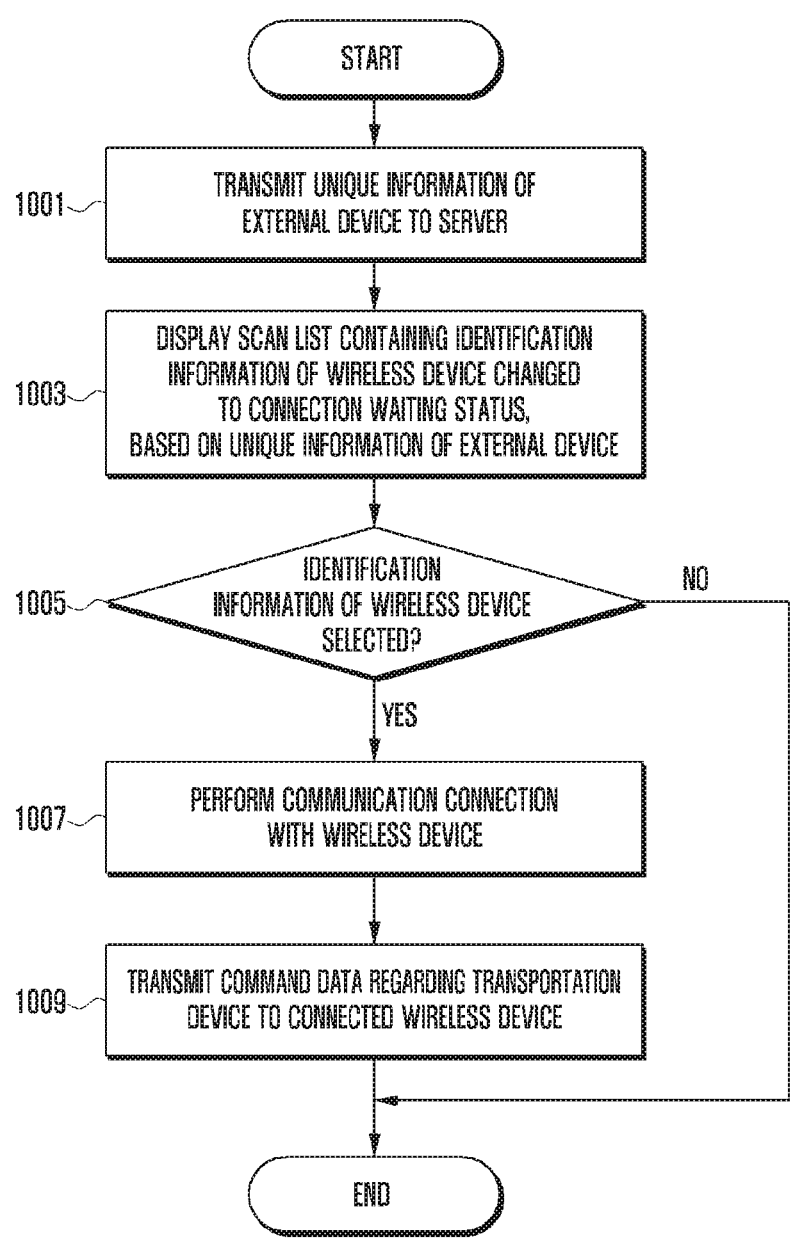
FIG. 10 is a flow diagram illustrating a method for performing a communication connection with a wireless device at an external device according to an embodiment of the present disclosure.

FIG. 10 is a flow diagram illustrating a method for performing a communication connection with the wireless device 10 at the external device 30 according to an embodiment of the present disclosure.

Referring to FIG. 10, at operation 1001, the external device 30 can transmit unique information thereof to the server 40. Then the server 40 can transmit, to the wireless device 10, the received unique information of the external device 30 and a connection waiting command for entering the wireless device 10 in a connection waiting status. The wireless device 10 that receives the connection waiting command can be changed to the connection waiting status.

At operation 1003, the external device 30 can display a scan list that contains identification information of the wireless device 10 which is changed, based on the unique information of the external device 30, to the connection waiting status.

When the scan list is displayed, the external device 30 can determine at operation 1005 whether the identification information of the wireless device 10 is selected.

If the identification information of the wireless device 10 is selected, the external device 30 can perform a communication connection with the wireless device 10 at operation 1007.

After the communication connection is performed, the external device 30 can transmit a command data regarding the transportation device 20 to the connected wireless device 10 at operation 1009.

The device (e.g., modules, the wireless device 10, or the external device 30) or method (e.g., operations) according to various embodiments can be implemented by at least one processor (e.g., the control unit 130) that executes commands (or instructions) contained in at least one of programs maintained in a computer-readable storage medium.

In case such commands are executed by the processor (e.g., the control unit 130), the processor can perform a particular function corresponding to that commands. The computer-readable storage medium can be, for example, the memory 120.

The program can be recorded in the non-transitory computer-readable storage medium which includes magnetic media such as a hard disk, a floppy disk, and a magnetic tape, optical media such as a compact disc read only memory (CD-ROM) and a digital versatile disc (DVD), magneto-optical media such as a floptical disk, and hardware devices such as a read only memory (ROM), a random access memory (RAM) and a flash memory. This storage medium can be included as a part of the wireless device 10, attached through a port of the wireless device 10, or included in an external device (e.g., a cloud, a server, or any other electronic device) located at the outside of the wireless device 10. Also, the program can be stored in a plurality of storage media, at least part of which can be located at the outside of the wireless device 10.

In addition, the commands can include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a communication connection with an external device at a wireless device capable of communicating with a transportation device, the method comprising:
storing unique information of at least one external device connectable with the wireless device in a connection target list, wherein the connection target list includes the unique information of the at least one external device that can transmit command data to the transportation device;
receiving, by a telecommunication module of the wireless device, a connection waiting command from an external server connected with the wireless device, wherein the external server is external from the transportation device;
in response to the received connection waiting command, changing a status to a connection waiting status allowing a connection with the external device;
receiving, by a short range communication module of the wireless device, a connection request from the external device having found the wireless device which is in the connection waiting status;
if unique information of the connection-requesting external device is contained in the connection target list, performing a communication connection with the connection-requesting external device in response to the connection request;
transmitting a successful connection notification to the external server in response to completing the communication connection;
receiving an encoded command data regarding the transportation device from the connected external device, wherein the external device encodes the command data using a first encryption key received from the external server in response to the external server receiving the successful connection notification;
decoding the encoded command data using a second encryption key received from the external server; and
transmitting the received command data to the transportation device.

2. The method of claim 1, wherein storing the unique information of the at least one external device connectable with the wireless device in the connection target list includes:
receiving unique information of the connectable external device from the external server; and
storing the received unique information of the external device in the connection target list.

3. The method of claim 1, further comprising:
terminating the connection waiting status when the communication connection with the connection-requesting external device is performed.

4. The method of claim 1, wherein the connection waiting status includes a discoverable mode status.

5. The method of claim 1, wherein receiving the connection request from the external device includes receiving a pairing request from the external device.

6. The method of claim 1, wherein the wireless device communicates with the external device in a wireless communication manner and communicates with the transportation device in a wired communication manner.

7. The method of claim 1, wherein:
the wireless device communicates with the external device using a first communication protocol and communicates with the external server using a second communication protocol, and
the first communication protocol is different from the second communication protocol.

8. A wireless device comprising:
a memory configured to store unique information of at least one external device connectable with the wireless device in a connection target list, wherein the connection target list includes the unique information of the at least one external device that can transmit command data to a transportation device;
a communication unit configured to communicate with an external server using a telecommunication module, the at least one external device using a short range communication module, and the transportation device using a wired connection, wherein the external server is external from the transportation device; and
a processor configured to:
receive a connection waiting command from the external server connected with the at least one external device,
in response to the connection waiting command received through the telecommunication module from the external server, change a status to a connection waiting status allowing a connection with the external device,
receive, through the short range communication module of the communication unit, a connection request from the external device having found the wireless device which is in the connection waiting status,
if unique information of the connection-requesting external device is contained in the connection target list, perform a communication connection with the connection-requesting external device through the communication unit in response to the connection request,
transmit a successful connection notification to the external server in response to completing the communication connection,
receive an encoded command data regarding the transportation device from the connected external device, wherein the external device encodes the command data using a first encryption key received from the external server,
decode the encoded command data using a second encryption key received from the external server, and
transmit the received command data to the transportation device.

9. The wireless device of claim 8, wherein when the communication unit is configured to receive unique information of the connectable external device from the external server, the processor is further configured to control the memory to store the received unique information of the external device in the connection target list.

10. The wireless device of claim 8, wherein the processor is further configured to terminate the connection waiting status when the communication connection with the connection-requesting external device is performed.

11. The wireless device of claim 8, wherein the connection waiting status includes a discoverable mode status.

12. The wireless device of claim 8, wherein the connection request includes a pairing request.

13. The wireless device of claim 8, wherein the communication unit is configured to communicate with the external device in a wireless communication manner and to communicate with the transportation device in a wired communication manner.

14. An external device comprising:
a display;
a communication unit communicating with an external server; and
a processor configured to:
  transmit unique information of the external device to the external server through a telecommunication module of the communication unit, wherein a connection target list in the external server includes the unique information of the external device that can transmit command data to a transportation device,
  display, through the display, a scan list containing identification information of a wireless device entered in a connection waiting status based on the transmitted unique information of the external device,
  when the identification information of the wireless device is selected in the scan list, perform a communication connection with the wireless device having the selected identification information through a short range communication module of the communication unit,
  receive a first encryption key from the external server based on the external server receiving a successful connection notification from the wireless device in response to completing the communication connection,
  encode a command data regarding the transportation device using the first encryption key, and
  transmit the encoded command data to the connected wireless device through the communication unit.

* * * * *